(12) United States Patent
Mueck

(10) Patent No.: US 8,509,326 B2
(45) Date of Patent: Aug. 13, 2013

(54) OFDM SPACE-TIME OR SPACE-FREQUENCY BLOCK CODE TRANSMITTER

(75) Inventor: Markus Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 856 days.

(21) Appl. No.: 12/619,156

(22) Filed: Nov. 16, 2009

(65) Prior Publication Data

US 2011/0116560 A1   May 19, 2011

(51) Int. Cl.
*H04L 27/28* (2006.01)

(52) U.S. Cl.
USPC .......................................... 375/260

(58) Field of Classification Search
USPC .............. 375/260, 130, 295, 349, 267, 316, 375/347; 455/101, 456.1; 370/208, 335, 370/342
See application file for complete search history.

(56) References Cited

U.S. PATENT DOCUMENTS

| 2005/0286462 A1* | 12/2005 | Roh et al. ................... 370/328 |
| 2008/0175184 A1 | 7/2008 | Chindapol et al. |
| 2010/0208841 A1* | 8/2010 | Walton et al. ................. 375/295 |

OTHER PUBLICATIONS

"On the Theory of Space-Time Codes for PSK Modulation", A. Roger Hammons, Jr. and Hesham El Gamal, IEEE Transactions on Information Theory, vol. 46, No. 2, Mar. 2000, pp. 524-542.
"Delay-Tolerant Distributed—TAST Codes for Cooperative Diversity", Mohamed Oussama Damen and A. Roger Hammons, Jr., IEEE Transactions on Information Theory, vol. 53, No. 10, Oct. 2007, pp. 3755-3773.

* cited by examiner

*Primary Examiner* — Khai Tran
(74) *Attorney, Agent, or Firm* — Eschweiler & Associates, LLC

(57) ABSTRACT

A transmitter for transmitting OFDM signals includes a space-time or space-frequency encoder to generate coded OFDM symbols by arranging a sequence of OFDM symbols or variants thereof in a predetermined space-time or space-frequency block matrix or a portion thereof. The transmitter also includes a frequency selector to select a particular OFDM carrier frequency out of a number of available OFDM carrier frequencies, and a signal generator to generate OFDM signals by applying the selected OFDM carrier frequency to the coded OFDM symbols.

19 Claims, 7 Drawing Sheets

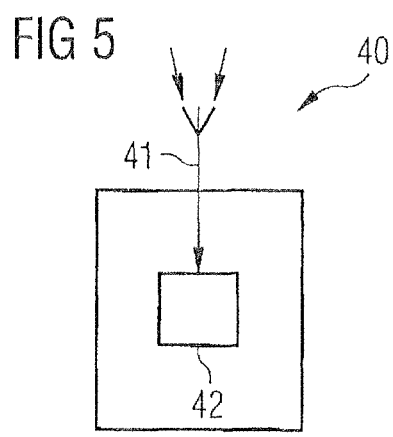

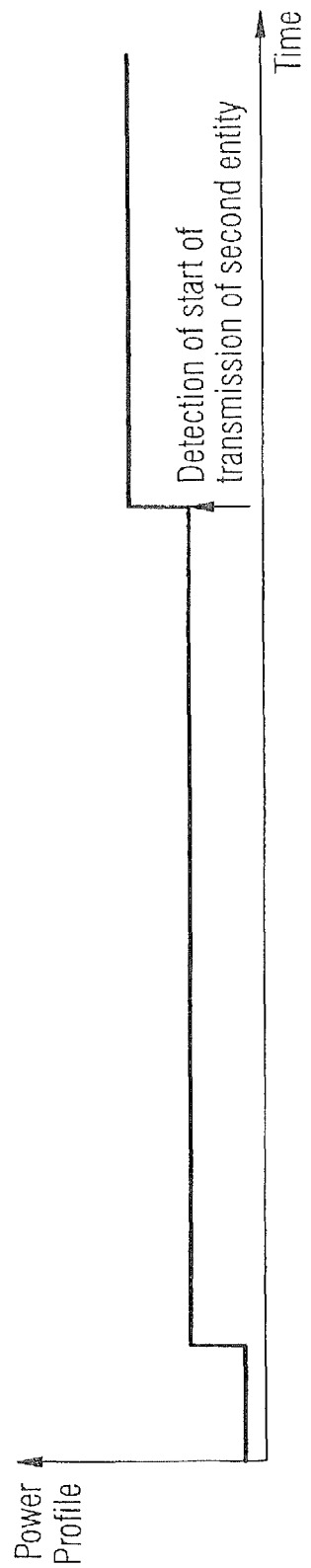

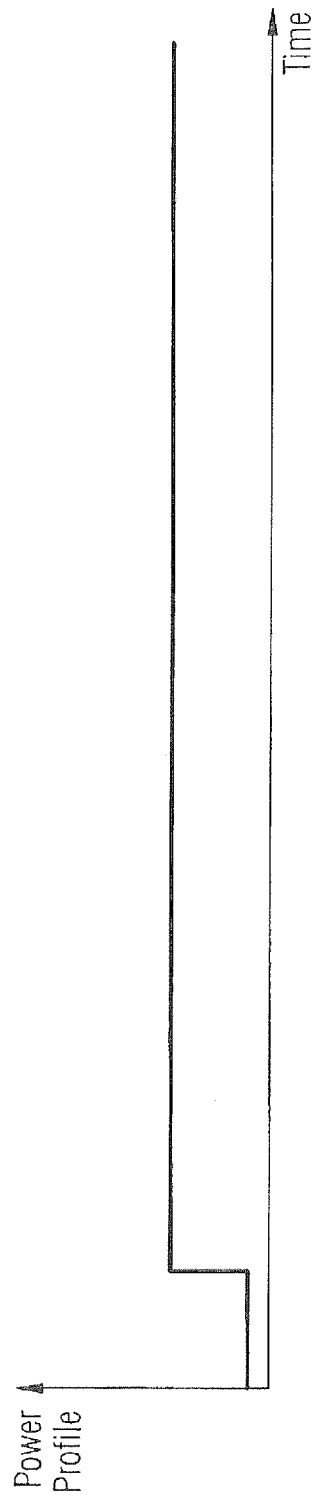

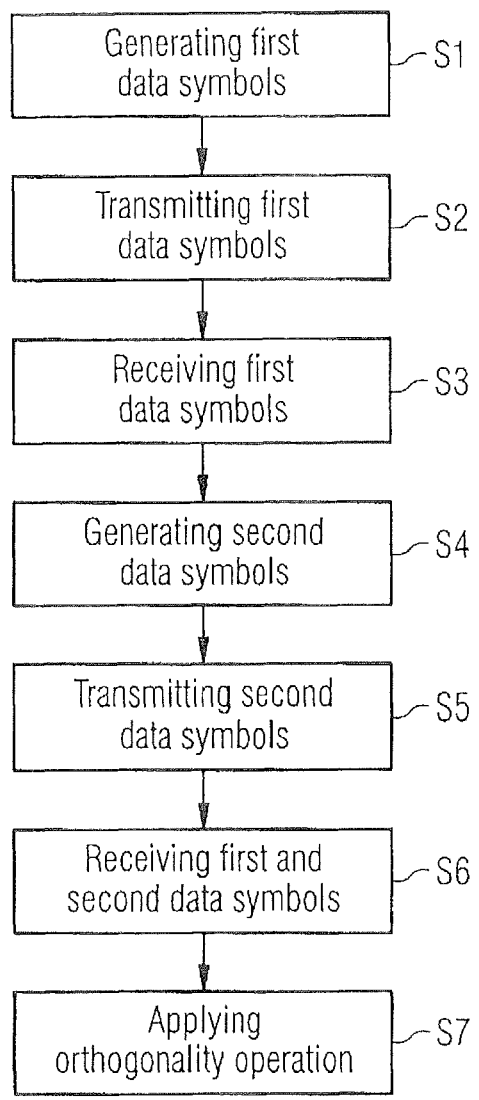

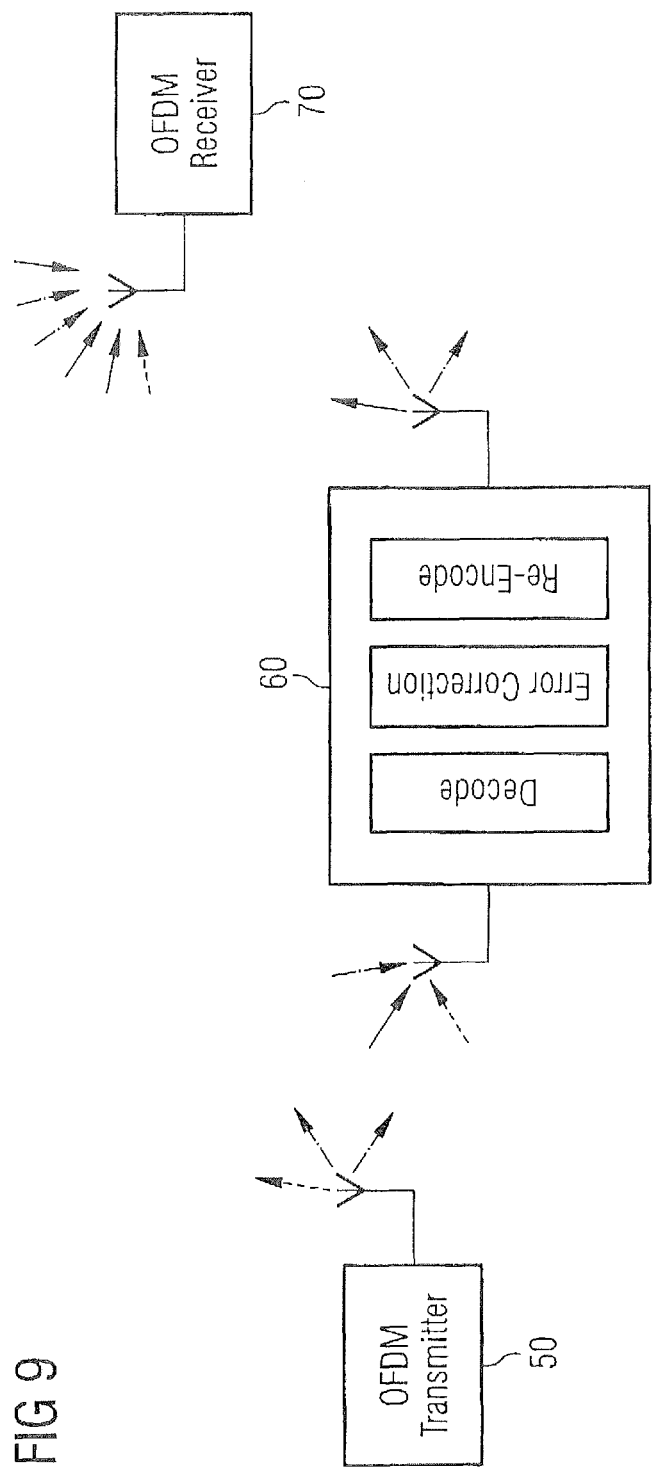

OFDM SPACE-TIME OR SPACE-FREQUENCY BLOCK CODE TRANSMITTER

FIELD

The present invention relates to a transmitter for transmitting OFDM signals, a receiver for receiving OFDM signals, and a method for transmitting and receiving OFDM signals.

BACKGROUND

Radio communication performance can be increased by use of multiple antennas and multiple-input and multiple-output (MIMO) techniques. The data throughput and link range can be increased by employing MIMO techniques without additional band width or transmit power. In addition or as a variant thereof data can be wirelessly transmitted from a base station to one or more spatially separated relay stations. In such MIMO systems, Space-Time Block Coding (STBC) or Space-Frequency Block Coding (SFBC) is a technique used to transmit multiple copies of a data stream across multiple antennas. A further improvement of the radio communication performance is to be expected when combining the above techniques with multicarrier transmission and reception methods like, for example, the well-known Orthogonal Frequency Division Multiplex (OFDM) transmission and reception technique.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

FIG. 5 shows a schematic block representation of a receiver according to an embodiment;

FIGS. 6A-6C show a time-dependent power profile corresponding to a delayed transmission for illustrating a receiver and a method for receiving OFDM signals according to an embodiment;

FIGS. 7A-7C show a time-dependent power profile corresponding to an immediate transmission for illustrating a receiver and a method for receiving OFDM signals according to an embodiment;

FIG. 8 shows a flow diagram of a method for transmitting and receiving OFDM signals according to an embodiment; and FIG. 9 shows a schematic block representation of a communication system according to an embodiment.

DETAILED DESCRIPTION

Figure 1:
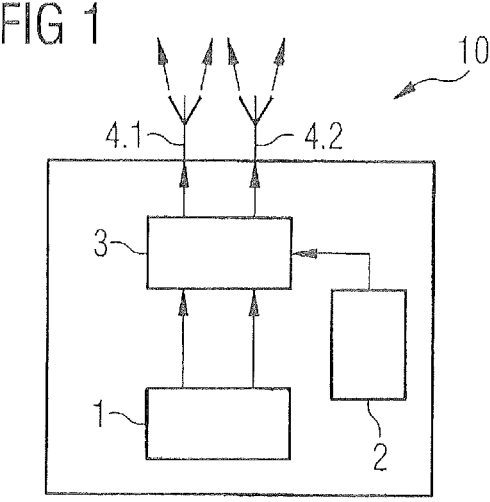
FIG. 1 shows a schematic block representation of a transmitter according to an embodiment.

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for radio transmission systems, namely for systems operating in the Orthogonal Frequency Division Multiplex (OFDM) mode. The apparatuses disclosed may be embodied in baseband segments of devices used for the transmission or reception of OFDM radio signals, in particular transmitters like base stations or relay stations and receivers like mobile phones, hand-held devices or other kinds of mobile radio receivers. The described apparatuses may be employed to perform methods as disclosed herein, although those methods may be performed in any other way as well.

An OFDM communication link may be operable with an amount of N sub-carriers with N being equal or greater than 1. Sub-carriers of such OFDM transmission systems may comprise a single frequency each. They may also comprise a plurality of frequencies, for example, adjoining frequencies in a frequency range or any arbitrary sub-set of frequencies. The number of frequencies included in a sub-carrier may in particular not be limited to any number of frequencies.

The apparatuses and methods as described herein may also be utilized for Multiple-Input/Multiple-Output (MIMO) systems. These systems can be set-up having one transmission unit and one reception unit, both units comprising more than one transmission or reception antenna, respectively. The systems can also be set-up having several transmission units, one transmission unit acting as a base station and one or more further transmission units acting as relay stations. Even in such a configuration, the base station can have more than one transmission antenna and the relay stations can each have more than one reception antenna and more than one transmission antenna. Independent therefrom the reception unit can be set-up having one or more reception antennas.

Referring to FIG. 1, there is shown a schematic block representation of a transmitter according to an embodiment. The transmitter 10 is configured for transmitting OFDM signals and comprises a space-time or space-frequency encoder 1 to generate coded OFDM symbols by arranging a sequence of OFDM symbols or variants thereof in a predetermined space-time or space-frequency block matrix or a portion thereof according to a delay tolerant code. The transmitter 10 further comprises a frequency selector 2 to select a particular OFDM carrier frequency out of a number of available OFDM carrier frequencies. The transmitter 10 further comprises a signal generator 3 to generate OFDM signals by applying the selected OFDM carrier frequency to the coded OFDM symbols.

The space-time or space-frequency encoder 1 can have an input (not shown) for inputting OFDM data symbols to be transmitted. In the encoder 1 the OFDM symbols or variants thereof are arranged in the block matrix according to a delay tolerant block code. The matrix can be, for example, a two-dimensional matrix when using the well-known Alamouti code as a fundamental example of a block code. In this case the encoder 1 can have two outputs connected with two inputs of the signal generator 2. The signal generator 3 can also have one further input connected with an output of the frequency selector 2. In the signal generator 3, the carrier frequency selected by the frequency selector 2 is mapped on the OFDM symbols as supplied by the encoder 1 in the two signal paths. The signal generator 3 comprises two outputs for outputting OFDM signals to be supplied to two antennas 4.1 and 4.2 for transmitting the OFDM signals.

In case of space-time encoding the mapping of the carrier frequency onto the OFDM symbols will be performed as follows. The OFDM symbols to be transmitted will be supplied to the space-time encoder 1 in a continuous manner. In the case of using an Alamouti code two subsequent OFDM symbols a, b are arranged in the following way in a two-dimensional matrix.

$$c = \begin{bmatrix} a & b \\ -b^* & a^* \end{bmatrix} \quad (1)$$

where the rows of the matrix represent time slots and the columns of the matrix represent transmission antennas and where the asterisk represents the complex conjugate. In such a case all the symbols of the above matrix are mapped with one and the same carrier frequency supplied by the frequency selector 2 in the signal generator 3. Thereafter two further OFDM data symbols c, d are supplied to the space-time encoder 1 and again arranged according to the above matrix. In this instant the frequency selector 2 independently selects a new carrier frequency from the plurality of available carrier frequencies and maps this new carrier frequency onto the symbols as output by the space-time encoder 1. In this way, the frequency selector 2 selects a new carrier frequency each time when a new sequence of OFDM symbols has been supplied to the space-time encoder 1 and is arranged according to the space-time block code matrix.

In other words, one OFDM carrier is selected for the application of a given code word matrix, e.g. the Kth carrier is selected for one particular code word matrix. This would mean that a system with "N" useful data OFDM carriers will typically apply for "N" independent code word matrices. Then each element of the matrix will be multiplied with the Kth OFDM carrier and output via one of the two signal paths to one of the two antennas 4.1 and 4.2.

According to an embodiment of the transmitter of FIG. 1, the transmitter is comprised of a first transmission unit comprising a first space-time or space-frequency encoder to generate first coded OFDM symbols by arranging the symbols or variants thereof in a first portion of the matrix, in particular the first row of the matrix, a first signal generator to generate first coded OFDM signals by applying the selected OFDM carrier frequency or frequencies to the first coded OFDM symbols, and at least one transmission antenna to transmit the first coded OFDM signals. The transmitter of FIG. 1 further comprises a second transmission unit spatially separated from the first transmission unit, the second transmission unit comprising a reception antenna to receive the first coded OFDM signals, a second space-time or space-frequency encoder to generate second coded OFDM symbols by arranging the symbols or variants thereof in a second portion of the matrix, in particular a second row of the matrix, a second signal generator to generate second coded OFDM signals by applying the selected OFDM carrier frequency to the second coded OFDM symbols, and at least one transmission antenna to transmit the second coded OFDM signals.

According to a further embodiment thereof, the second transmission unit is configured to start transmitting the second coded OFDM signals during receiving first coded OFDM signals from the first multicarrier transmission unit.

According to a further embodiment thereof, one or more of the first transmission unit and the second transmission unit comprises more than one transmission antenna.

According to a further embodiment thereof, the second transmission unit comprises more than one reception antenna.

According to a further embodiment thereof, an orthogonality operation unit is operably associated with one or more of the first transmission unit and the second transmission unit, wherein the orthogonality operation unit is configured to apply an orthogonality operation on one or more of the first coded OFDM signals and the second coded OFDM signals or respective particular ones thereof, so that time overlapping first and second coded OFDM symbols of successive blocks of OFDM symbols become orthogonal to each other.

According to a further embodiment thereof, the first transmission unit and the second transmission unit are electrically connected to each other by a wire.

Figure 2:
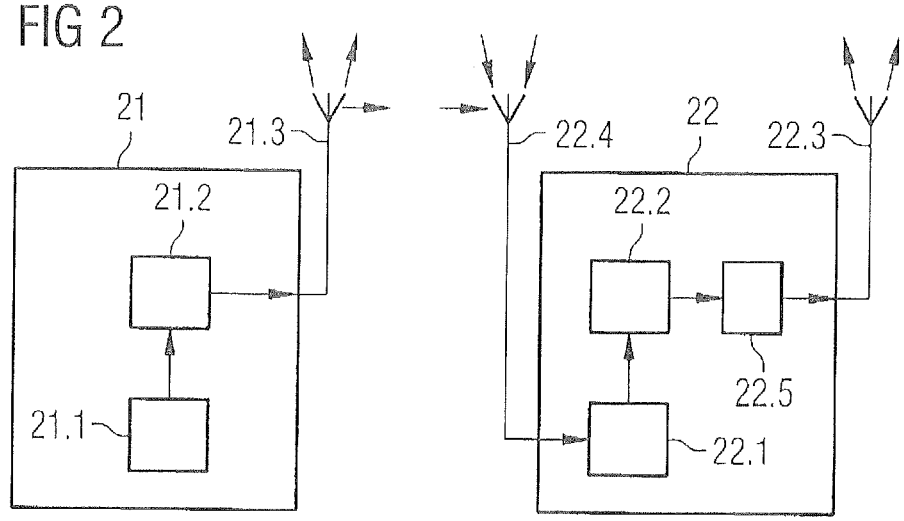
FIG. 2 shows a schematic block representation of a transmitter according to an embodiment.

Referring to FIG. 2, there is shown a schematic block representation of a transmitter according to an embodiment. The transmitter 20 is configured for transmitting OFDM signals and comprises a first transmission unit 21 comprising a first space-time or space-frequency encoder 21.1 to generate first coded OFDM symbols by arranging a sequence of OFDM symbols or variants thereof in a first portion of a predetermined space-time or space-frequency block matrix. The first transmitter unit 21 further comprises a first signal generator 21.2 to generate first coded OFDM signals by applying one or more OFDM carrier frequencies to the first coded OFDM symbols, and at least one transmission antenna 21.3 to transmit the first coded OFDM signals. The transmitter 20 further comprises a second transmission unit 22 spatially separated from the first transmission unit 21, the second transmission unit 22 comprising a reception antenna 22.4 to receive the first coded OFDM signals transmitted by the first transmission unit 21. The second transmission unit 22 further comprises a second space-time or space-frequency encoder 22.1 to generate second coded OFDM symbols by arranging the OFDM symbols or variants thereof in a second portion of the predetermined space-time or space-frequency block matrix, a second signal generator 22.2 to generate second coded OFDM signals by applying an OFDM carrier frequency to the second coded OFDM signals, and at least one transmission antenna 22.3 to transmit the second coded OFDM signals. The second transmission unit 22 also comprises an orthogonality operation unit 22.5 arranged in or operably associated with the second transmission unit 21, wherein the orthogonality operation unit 22.5 is configured to apply an orthogonality operation to one or more of the first coded OFDM signals and the second coded OFDM signals or respective particular ones thereof, so that time overlapping first and second coded OFDM symbols of successive blocks of OFDM symbols become orthogonal with each other.

According to another embodiment, the orthogonality operation unit 22.5 can also be arranged in the first transmission unit 21 or in both the first and the second transmission units.

The function and purpose of the orthogonality unit 22.5 will be explained in more detail below.

According to an embodiment of the transmitter 20 of FIG. 2, the first space-time or space-frequency encoder 21.1 is configured to arrange the first coded OFDM symbols of the sequence or variants thereof in a first row of the space-time block matrix, and the second space-time or space-time frequency encoder 22.1 is configured to arrange the second coded OFDM symbols of the sequence or variants thereof in a second row of the space-time or space-frequency block matrix. More detailed examples will be shown and explained further below.

In the embodiments of FIGS. 1 and 2, delay-tolerant block codes are selected wherein both first and second space-time or space-frequency block encoders 21.1 and 22.1 function on the basis of the selected delay-tolerant space-time or space-frequency block code. A general problem of a configuration such as that of the embodiment shown in FIG. 2 lies in the fact that the second transmission unit 22 acting as a relay station has to receive all the information about the OFDM symbols to be transmitted before it can start its own transmission. The definition of delay-tolerant codes is well known in the art. Roughly speaking it is essential to determine whether a horizontal shift of the code matrix lines stills leads to full code diversity. More specifically, two criteria have to be examined. The first one is the rank criterion in which the diversity advantage $r=\text{rank}(f(c)-f(e))$ over all pairs of distinct codewords c,e of the code matrix is maximized. The second one is the product distance criterion in which the coding advantage $\eta=(\lambda_1 \lambda_2 \ldots \lambda_r)^{1/r}$ over all pairs of distinct codewords c,e of the code matrix is maximized wherein $\lambda_1 \lambda_2 \ldots \lambda_r$ are the non-zero eigenvalues of $A=(f(c)-f(e)))(f(c)-f(e))^H$. A full explanation can be found in the publication "On the theory of space-time codes for PSK modulation" by A. R. Hammonds in IEEE Transactions on Information Theory, Vol 46, No. 2, 2 Mar. 2000, which is herewith incorporated by reference. An example of a delay-tolerant code will be shown in greater detail further below.

According to an embodiment of the transmitter 20 of FIG. 2, one or more of the first transmission unit 21 and the second transmission unit 22 comprises more than one transmission antenna.

According to an embodiment of the transmitter 20 of FIG. 2, the second transmission unit 22 comprises more than one reception antenna.

According to an embodiment of the transmitter 20 of FIG. 2, the orthogonality operation unit 22.5 is configured to apply a phase rotation operation on one or more of the first coded OFDM signals and the second coded OFDM signals or respective particular ones thereof so that overlapping symbols have a phase difference of 90° relative to each other. Alternatively, the first signal generator 21.2 and the second signal generator 22.2 are configured such that time overlapping first and second coded OFDM signals of successive blocks of OFDM signals have different signal strength or signal power. This can help when separating such overlapping signals at the receiver as the overlapping signals may not be completely orthogonal with each other. Another solution of this problem would be an orthogonality operation at the receiver which will be explained in more detail further below.

According to an embodiment of the transmitter 20 of FIG. 2, the first transmission unit 21 and the second transmission unit 22 are electrically connected to each other by a wire. This would be another solution for the above-indicated problem of delay-intolerant space-time block codes as in this case the symbols to be sent by the second transmission unit would be transmitted in an early stage from the first transmission unit 21 to the second transmission unit 22 over the wire.

The first step to be performed in the first transmission unit includes selecting a suitable delay tolerant code from the multitude of available ones in the literature. The transmission of the first transmission unit 21 must be such that all symbols are available to the second transmission unit 22 when it has to start its transmission. If, for example, a code as follows is used $$c_{ExtA1} = \begin{bmatrix} a & -b^* & -b^* \\ b & a^* & a^* \end{bmatrix} \quad (2)$$

which is also called the extended Alamouti code, the first transmission unit 21 may perform a transmission given by the first row of the matrix. The second transmission unit 22 will be able to start its transmission at the third symbol time since its transmission starts with "b". The symbol "b", on the other hand, is only transmitted by the first transmission unit 21 at the second symbol time and can thus be known by the second transmission unit 22 at that moment. A transmission involving this symbol is thus possible at the third symbol time or later.

Now each transmission unit selects the row of the code word matrix which it is going to use for its transmission. In the example of the above code matrix, the first transmission unit 21 may pick the first row (a $-b^*$ $-b^*$) and the second transmission unit 22 may pick the second row (b a* a*). Furthermore, the same scheme can be applied as described above in connection with FIG. 1, namely that one OFDM carrier is selected for the application of a given code word matrix, e.g. the "K"th carrier is selected. So when the first transmission unit 21 will pick the first row, the first transmitted OFDM symbol will use the symbol "a" on the "K"th carrier, the second OFDM symbol will contain the symbol "$-b^*$" on the "K"th carrier and the third OFDM symbol will contain the symbol "$-b^*$" on the "K"th carrier. The remaining carriers will be used independently for other code word matrices which will be set-up for the next sequences of OFDM symbols supplied to the first space-time or space-frequency block encoder 21.1.

The second transmission unit 22 will start its transmission as soon as it has received all relevant symbols from the transmissions of the first transmission unit 21. According to the above embodiment, the second transmission unit 22 will start the transmission with a delay of 2 OFDM symbols, since the reception of the symbol "b" is required before the second transmission unit 22 can start its operation. Since the second transmission unit 22 has picked the second row of the above code matrix (b a* a*), it will use the symbol "b" on the "K"th carrier of its first transmitted OFDM symbol (which is transmitted with a delay of 2 OFDM symbols due to the issue discussed above). The second transmitted OFDM symbol will use the symbol "a*" on the "K"th carrier and the third transmitted OFDM symbol will also use the symbol "a*" on the "K"th carrier.

In the following the function and purpose of the orthogonality operation unit will be described in more detail. A general problem is due to the fact that there is a mixture between preceding and following symbols and the one currently under consideration during an overlapping period. For example, a code like the following can be used:

$$c_{DT} = \begin{bmatrix} a & b & c & d \\ c+d & a+c & a+b+d & b+c \end{bmatrix} \quad (3)$$

This code can be further developed by introducing a delay:

$$c_{DT,1} = \begin{bmatrix} a & b & c & d & 0 & 0 \\ 0 & 0 & c+d & a+c & a+b+d & b+c \end{bmatrix}. \quad (4)$$

To illustrate the problem of mixture between neighboring symbols, in the following an index n for the data symbols $a_n$, $b_n$, $c_n$, $d_n$ is introduced in order to highlight the fact that different symbols may get mixed up:

$$c_{DT,1} = \begin{matrix} a_n & b_n & c_n & d_n & a_{n+1} & b_{n+1} \\ a_{n-1}+b_{n-1}+d_{n-1} & b_{n-1}+c_{n-1} & c_n+d_n & a_n+c_n & a_n+b_n+d_n & b_n+c_n \end{matrix} \quad (5)$$

The question is how the interference terms $a_{n-1}+b_{n-1}+d_{n-1}$, $b_{n-1}+c_{n-1}$, $a_{n+1}$, $b_{n+1}$ can be handled. The idea presented here is to perform an additional operation "$\Theta(\bullet)$" on either the symbols transmitted by the first or second transmission unit, such that there is orthogonality between the symbols of the first and second row of the code matrix within the overlapping part. This orthogonality can be exploited in the receiver in order to separate the two code words. According to the embodiment of FIG. 2, the additional operation is carried out in the transmitter. According to a further embodiment the additional orthogonality operation is carried out in the receiver which will be outlined further below.

Figure 3:
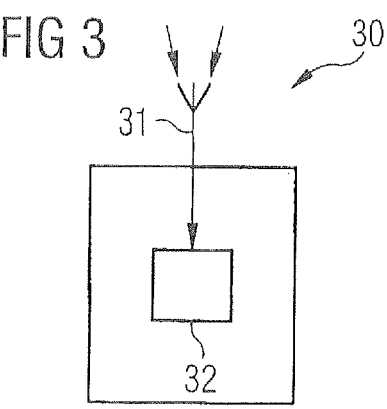
FIG. 3 shows a schematic block representation of a receiver according to an embodiment.

Referring to FIG. 3, there is shown a schematic block representation of a receiver according to an embodiment. The receiver 30 as shown in FIG. 3 is configured for receiving OFDM signals, the OFDM signals being transmitted in the form of space-time or space-frequency coded blocks containing first coded OFDM signals and second coded OFDM signals. The receiver 30 comprises at least one reception antenna 31 and an orthogonality operation unit 32 to apply an orthogonality operation on one or more of the first coded OFDM signals and the second coded OFDM signals or respective particular ones thereof, so that time overlapping first and second coded OFDM symbols of successive blocks of OFDM symbols become orthogonal with each other. The orthogonality thus achieved can be further exploited in order to separate the two code words.

According to an embodiment of the receiver 30 of FIG. 3, the orthogonality operation unit 32 is configured to apply a phase rotation operation on one or more of the first coded OFDM signals and the second coded OFDM signals or respective particular ones thereof so that overlapping symbols have a phase difference of 90° relative to each other. In case of BPSK transmissions for example, the receiver will receive the various symbols weighted by corresponding channel coefficients (the channel coefficients $H_1$, $H_2$ are defined for one given carrier "K", these are expected to be known in the various transmission unities, typically by a prior exchange of channel state information data):

$$r_{DT,1} = \begin{bmatrix} H_1 a_n & H_1 b_n & H_1 c_n & H_1 d_n & H_1 a_{n+1} & H_1 b_{n+1} \\ H_2(a_{n-1}+b_{n-1}+d_{n-1}) & H_2(b_{n-1}+c_{n-1}) & H_2(c_n+d_n) & H_2(a_n+c_n) & H_2(a_n+b_n+d_n) & H_2(b_n+c_n) \end{bmatrix} \quad (6)$$

The above matrix representation has to be understood as follows. The receiver receives actually a 1×N vector where each of the columns of the above matrix are added. The matrix representation above is just to illustrate where the various components are coming from.

The operation "$\Theta(\bullet)$" can now be applied to the overlapping elements in the first two columns of row two: $\Theta(H_2(a_{n-1}+b_{n-1}+d_{n-1}))$ leads to a symbol that has a phase difference of 90° compared to $H_1 a_n$. In the case of BPSK constellations, this leads to a perfect orthogonality so that $H_1 a_n$ as well as $H_2(a_{n-1}+b_{n-1}+d_{n-1})$ can be extracted. Thus, the subsequent operations are performed as if zero elements were included:

$$c_{DT,1} = \begin{bmatrix} a & b & c & \ldots & \ldots & \ldots \\ 0 & 0 & c+d & \ldots & \ldots & \ldots \end{bmatrix} \quad (7)$$

Concerning the last two columns of $r_{DT}$, a similar operation "$\Theta(\bullet)$" is applied to the first row, i.e. to the symbols $H_1 a_{n+1}$ and $H_1 b_{n+1}$. It is to be noted that this operation "$\Theta(\bullet)$" must then also be applied to all subsequent (or preceding) elements of the corresponding row. In the last case the operation "$\Theta(\bullet)$" is not only applied to $H_1 a_{n+1}$ and $H_1 b_{n+1}$ (which are of interest in this given code word) but also to the following $H_1 c_{n+1}$ and $H_1 d_{n+1}$. The same is true for the first two columns of the second row, i.e. "$\Theta(\bullet)$" is not only applied to $H_2(a_{n-1}+b_{n-1}+d_{n-1})$ and $H_2(b_{n-1}+c_{n-1})$ but also to the preceding $H_2(a_{n-1}+c_{n-1})$ and $H_2(c_{n-1}+d_{n-1})$.

According to a further embodiment of the receiver 30 of FIG. 3, the receiver comprises more than one reception antenna.

A further possibility for dealing with the interference terms comprises power-boosting of symbols. In particular, the symbols of the first two columns of the second row in the upper example could be emitted at a higher power compared to the symbols in the first row. Then the symbols can be separated in the receiver by applying suitable modulo operations. For that reason in connection with the transmitters as described in the above FIGS. 1 and 2 there were described further embodiments in which the respective signal generators are configured such that time overlapping first and second coded OFDM signals of successive blocks of OFDM signals have different signal strength or signal power.

Figure 4A:
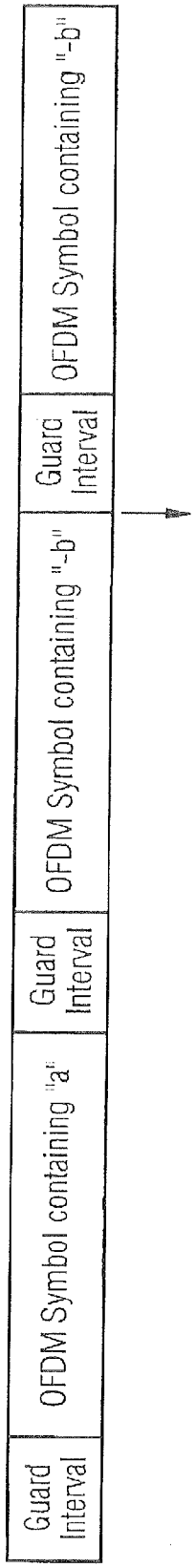
FIGS. 4A and 4B show schematic representations of different embodiments of the relative temporal positions of the transmissions of the first and second transmission units.

A further issue arises when considering the start of the transmissions from the second transmission unit 22. It is illustrated in FIG. 4A using the example of the extended Alamouti code. An essential point is the fact that the second transmission unit should receive the second OFDM symbol from the first transmission unit and start the transmission just afterwards (see arrow in FIG. 4A) which can be a challenging issue. This issue can be addressed by one of the following measures.

According to a first embodiment, the symbols to be retransmitted are calculated in the time domain only. This is possible since the fast Fourier transform (FFT) is a linear operation so that additions or subtractions can either be performed in the time or frequency domain. Also, frequency domain complex conjugate operations can be translated into the time domain. The disadvantage of this approach is the following one: The received symbols need to be taken "as such", i.e. no further error correction can be performed. The second transmission unit can only amplify the signals (and perform the operations required for creating the delay tolerant symbols).

Figure 4B:
Figure 4B:
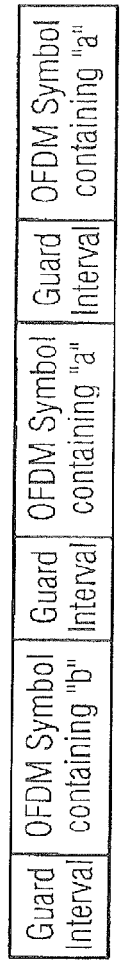

According to another embodiment the symbols are decoded after reception of the relevant OFDM time domain signals. Furthermore, error correction is applied and the symbols to be retransmitted are thus of higher accuracy compared to the previous embodiment. This requires typically some calculation time and the transmission can not start in perfect alignment with the subsequent symbol transmitted by the first transmission unit. It is however possible, to use "Guard Interval" time (which needs to be inserted prior to each OFDM symbol) and thus the transmission will be as shown in FIG. 4B. However, the overall delay must not be larger than the Guard Interval time; in order to ensure a correct operation of the system, some considerable part of the Guard Interval time should remain.

A further issue can be addressed as follows. The delay tolerant codes can be used in various ways. One way includes having one first transmission unit that transmits the full code word using multiple antennas. Then, no further second transmission unit will be required. In this case, of course, no delay occurs between the various rows of the delay tolerant code word. Another way is to use the upper approach where a second transmission unit first has to receive the code words from a first transmission unit before being able to start the transmission. Then a delay is present. The final receiver of the signals emitted by the first and second transmission unit should, however, know which delay tolerant code is used. This is typically the case, since it needs to be defined by the relevant communication standard. However, the final receiver should be able to detect the delay that is eventually added by a second transmission unit.

Referring to FIG. 5, there is shown a schematic block representation of a receiver for receiving OFDM signals according to an embodiment. The receiver 40 operates in a wireless communication network, the network comprising either a single transmission unit or a first OFDM transmission unit and a second OFDM transmission unit, and the receiver 40 comprises at least one reception antenna 41 and a power detection unit 42 to detect time-dependent power profiles of signals received at the reception antenna 41.

In the following two examples, a first one will be presented in which a delay is present and in the second one no delay is present.

Referring to FIGS. 6A-6C, there are shown schematic representations of transmissions of the first and second transmission units (FIG. 6A and FIG. 6B) and the respective time-dependent power profile (FIG. 6C). It can be seen that the time-dependent power profile exhibits a first step representing the onset of the transmission of the first transmission unit and a second step representing the onset of the transmission of the second transmission unit. It can be seen from the temporal relationship between the transmissions that a delay tolerant code is applied in the first and second transmission units since the second transmission unit is able to start its transmission during the transmission of the first transmission unit, in particular after receiving the OFDM symbol containing "−b*" from the first transmission unit. Moreover, it can be seen that in the second transmission unit an additional delay according to the reception and operations is applied as explained above in connection with FIG. 4B.

Referring to FIGS. 7A-7C, there are shown schematic representations of the transmissions of the first and second transmission units in their relative temporal relationship to each other (FIG. 7A and FIG. 7B) and the time-dependent power profile (FIG. 7C) in the case of an immediate transmission of the second row of the delay tolerant code by the second transmission unit, i.e. no time delay of the transmissions between the first and second transmission unit. The time-dependent power profile thus shows a "one-step" profile which means that the whole transmission of all elements of the delay tolerant code word is handled by a single unit. The receiver is thus able to blindly detect the presence of a delay and perform the corresponding decoding actions.

Referring to FIG. 8, there is shown a flow diagram of a method for transmitting and receiving OFDM signals according to an embodiment. The method comprises generating in a first OFDM transmission unit first coded data symbols by arranging the OFDM symbols of the sequence or variants thereof in a space-time block code matrix or a portion thereof at s1. The method further comprises transmitting the first coded data symbols at s2, and receiving the first coded data symbols in a second OFDM transmission unit spatially separated from the first OFDM transmission unit at s3. The method further comprises generating second coded data symbols by arranging the OFDM symbols of the sequence or variants thereof in the space-time block code matrix or a portion thereof at s4, and transmitting the second coded data symbols at s5. Still further, the method comprises receiving the first and second coded data symbols in a receiver at s6, and applying an orthogonality operation on the first or second coded data symbols or on respective particulars ones thereof so that time overlapping first and second coded data symbols of successive blocks of coded data symbols become orthogonal with each other at s7.

It is to be noted that the above method is not limited to the particular sequence as represented here. Other sequences of the steps are possible as far as deemed reasonable by the skilled person.

According to an embodiment of the method of FIG. 8, the orthogonality operation is comprised of a phase rotation of received OFDM symbols in the transmitter or in the receiver.

According to an embodiment of the method of FIG. 8, the orthogonality operation is comprised of a signal strength or signal power variation between first and second OFDM symbols in the transmitter.

According to an embodiment of the method of FIG. 8, one or more of transmitting the first coded OFDM symbols and the second coded OFDM symbols is carried out with more than one transmission antenna.

According to an embodiment of the method of FIG. 8, receiving of the first coded OFDM symbols by the second OFDM transmission unit is carried out with more than one reception antenna.

According to an embodiment of the method of FIG. 8, receiving of the first and second coded OFDM symbols by the receiver is carried out with more than one reception antenna.

Referring to FIG. 9, there is shown a schematic block representation of a complete OFDM transmission and reception system according to an embodiment. An OFDM transmitter 50 plays the role of a first transmission unit and transmits the first row of a delay tolerant code, e.g. based on the code given by the above equation (2). Wherever required, the operation "$\Theta(\bullet)$" is applied in order to ensure the orthogonality between overlapping code words. The relay station 60 plays the role of the second transmission unit and receives the incoming elements from the OFDM transmitter 50, decodes them, performs error correction and all operations required in order to create the symbols of the second row of the matrix (e.g. the one given by equation (2)). Where ever required, the operation "$\Theta(\bullet)$" is applied in order to ensure the orthogonality between overlapping code words. Finally the relay station 60 transmits the second row of the code matrix (with the operation "$\Theta(\bullet)$" being performed additionally wherever required) with a maximum delay being two OFDM symbol times (for the example of the code given by (2)) plus an additional delay smaller compared to the Guard Interval of OFDM symbols as illustrated by FIG. 4B. An OFDM receiver 70 then receives the OFDM symbols from the OFDM transmitter 50 and the relay station 60.

The above description mainly focused on the application of delay tolerant codes in the time domain, namely by performing timely delayed transmissions. However, as already indicated the application of the delay tolerant codes to OFDM can also be applied in the frequency domain, namely by performing frequency delayed transmissions. This means that the delay is considered in the frequency domain wherein the "delay" is actually a "frequency shift" between the signals received from various sources while no delay is assumed to be present in the time domain. Then, the receiver is able to decode efficiently the signal despite the frequency shift. This will be illustrated as follows.

As an example for an initial transmission an OFDM symbol is assumed to have 4 frequency domain carriers only:

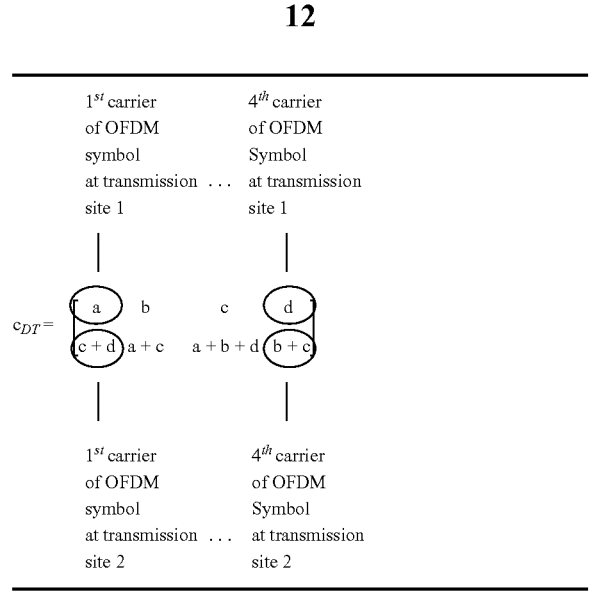

The corresponding symbols are transformed into the time domain prior to transmission by an IFFT and typically a cylic prefix is added prior to each time domain OFDM symbol.

In case a frequency shift occurs, for example due to small offsets in the oscillators at the distinct transmission sites, the following symbols are eventually received in frequency domain:

$$c_{DT,1} = \begin{bmatrix} a & b & c & d & 0 & 0 \\ 0 & 0 & c+d & a+c & a+b+d & b+c \end{bmatrix}$$

or $$c_{DT,2} = \begin{bmatrix} 0 & 0 & a & b & c & d \\ c+d & a+c & a+b+d & b+c & 0 & 0 \end{bmatrix}$$

As it can be seen, we have an offset effect in the frequency domain (2 carrier's frequency offset in the upper examples). This is a dual problem compared to the time domain offset occurring in above equations (4) and (5). It should be added that the channel impulse response is not included here, which would lead to a weighting of OFDM carriers by a channel coefficient. For sake of simplicity, channel convolution is omitted in this example. What is received is actually a vector containing the addition of the upper and lower row of the matrices.

Finally, it should be noted, that larger OFDM symbols (i.e. with more OFDM carriers) can be constructed by concatenating delay invariant codes in the frequency domain as follows:

$$c_{DT} = \begin{bmatrix} a_1 & b_1 & c_1 & d_1 & a_2 & b_2 & c_2 & d_2 \\ c_1+d_1 & a_1+c_1 & a_1+b_1+d_1 & b_1+c_1 & c_2+d_2 & a_2+c_2 & a_2+b_2+d_2 & b_2+c_2 \end{bmatrix} \cdots$$

Optionally, zero carriers can be inserted between consecutive symbols in order to avoid overlap issues between consecutive codes as highlighted for time delays in the original invention:

$$c_{DT} = \begin{bmatrix} a_1 & b_1 & c_1 & d_1 & 0 & 0 & a_2 & b_2 & c_2 & d_2 \\ c_1+d_1 & a_1+c_1 & a_1+b_1+d_1 & b_1+c_1 & 0 & 0 & c_2+d_2 & a_2+c_2 & a_2+b_2+d_2 & b_2+c_2 \end{bmatrix}$$

Also, it is possible to concatenate non-identical delay tolerant codes. This is illustrated for the upper code in combination with code (7) from the original disclosure document:

$$c_{DT} = \begin{bmatrix} a_1 & b_1 & c_1 & d_1 & a_2 & -b_2^* & -b_2^* \\ c_1+d_1 & a_1+c_1 & a_1+b_1+d_1 & b_1+c_1 & b_2 & a_2^* & a_2^* & \cdots \end{bmatrix}$$

or optionally with a zero-carrier separation:

$$c_{DT} = \begin{bmatrix} a_1 & b_1 & c_1 & d_1 & 0 & 0 & a_2 & -b_2^* & -b_2^* \\ c_1+d_1 & a_1+c_1 & a_1+b_1+d_1 & b_1+c_1 & 0 & 0 & b_2 & a_2^* & a_2^* & \cdots \end{bmatrix}$$

What is claimed is:

1. A transmitter for transmitting OFDM signal, comprising:
    a space-time or space frequency encoder configured to generate coded OFDM symbols by arranging a sequence of OFDM symbols or variants thereof in a predetermined space-time or space-frequency block matrix or a portion thereof according to a delay tolerant code,
    a frequency selector configured to select a particular OFDM carrier frequency out of a number of available OFDM carrier frequencies, and
    a signal generator configured to generate OFDM signals by applying the selected OFDM carrier frequency to the coded OFDM symbols;
    a first transmission unit comprising a first space-time or space-frequency encoder configured to generate first coded OFDM symbols by arranging the OFDM symbols of the sequence or variants thereof in a first portion of the predetermined space-time or space-frequency block matrix, a first signal generator configured to generate first coded OFDM signals by applying the selected OFDM carrier frequency to the first coded OFDM symbols, and at least one transmission antenna configured to transmit the first coded OFDM signals, and
    a second transmission unit spatially separated from the first transmission unit, the second transmission unit comprising a reception antenna configured to receive the first coded OFDM signals, a second space-time or space-frequency encoder configured to generate second coded OFDM symbols by arranging the OFDM symbols of the sequence or variants thereof in a second portion of the predetermined space-time or space-frequency block matrix, a second signal generator configured to generate second coded OFDM signals by applying the selected OFDM carrier frequency to the second coded OFDM symbols, and at least one transmission antenna to transmit the second coded OFDM signals.

2. The transmitter according to claim 1, wherein
the first encoder is configured to arrange the OFDM symbols of the sequence or variants thereof in a first row of the block matrix, and
the second encoder is configured to arrange the OFDM symbols of the sequence or variants thereof in a second row of the block matrix.

3. The transmitter according to claim 1, wherein the second transmission unit is configured to start transmitting the second coded OFDM signals during receipt of the first coded OFDM signals from the first transmission unit.

4. The transmitter according to claim 1, wherein
one or more of the first transmission unit and the second transmission unit comprises more than one transmission antenna.

5. The transmitter according to claim 1, further comprising:
    an orthogonality operation unit arranged in one or more of the first transmission unit and the second transmission unit, wherein the orthogonality operation unit is configured to apply an orthogonality operation on one or more of the first coded OFDM signals and the second coded OFDM signals or respective particular ones thereof, so that time overlapping first and second coded OFDM symbols of successive blocks of OFDM symbols are orthogonal to each other.

6. A transmitter for transmitting OFDM signals, comprising:
    a first transmission unit comprising a first space-time or space-frequency encoder configured to generate first coded OFDM symbols by arranging a sequence of OFDM symbols or variants thereof in a first portion of a predetermined space-time block matrix, a first signal generator configured to generate first coded OFDM signals by applying an OFDM carrier frequency to the first coded OFDM symbols, and at least one transmission antenna configured to transmit the first coded OFDM signals, and
    a second transmission unit spatially separated from the first transmission unit, the second transmission unit comprising a reception antenna configured to receive the first coded OFDM signals, a second space-time or space-frequency encoder configured to generate second coded OFDM symbols by arranging the OFDM symbols of the sequence of variants thereof in a second portion of the predetermined space-time or space-frequency block matrix, a second signal generator configured to generate second coded OFDM signals by applying an OFDM carrier frequency to the second coded OFDM signals, and at least one transmission antenna configured to transmit the second coded OFDM signals, and
    an orthogonality operation unit arranged in one or more of the first transmission unit and the second transmission unit, wherein the orthogonality operation unit is configured to apply an orthogonality operation on one or more of the first coded OFDM signals and the second coded OFDM signals or respective particular ones thereof, so that time overlapping first and second coded OFDM symbols of successive blocks of OFDM symbols are orthogonal to each other.

7. The transmitter according to claim 6, further comprising:

a frequency selector operably associated with the first transmission unit configured to select a particular OFDM carrier frequency out of a number of available OFDM carrier frequencies, each time a sequence of OFDM symbols or variants thereof is arranged in a first portion of the predetermined space-time or space-frequency block matrix, and wherein the first signal generator is configured to generate the first coded OFDM signals by applying the particular selected OFDM carrier frequency to the first coded OFDM symbols.

8. The transmitter according to claim 6, wherein the first space-time or space-frequency encoder is configured to arrange the OFDM symbols of the sequence or variants thereof in a first row of the space-time or space-frequency block matrix, and the second space-time or space-frequency encoder is configured to arrange the OFDM symbols of the sequence or variants thereof in a second row of the space-time or space-frequency block matrix.

9. The transmitter according to claim 6, wherein the second transmission unit is configured to start transmitting the second coded OFDM signals during receipt of the first coded OFDM signals from the first transmission unit.

10. The transmitter according to claim 6, wherein one or more of the first transmission unit and the second transmission unit comprises more than one transmission antenna.

11. The transmitter according to claim 6, wherein the first signal generator and the second signal generator are configured such that time overlapping first and second coded OFDM signals of successive blocks of OFDM signals have different signal strength or power.

12. The transmitter according to claim 6, wherein the first transmission unit and the second transmission unit are electrically connected to each other by a wire.

13. A receiver for receiving OFDM signals, the OFDM signals being transmitted in the form of space-time or space-frequency coded blocks containing first coded OFDM signals and second coded OFDM signals, the receiver comprising:

at least one reception antenna configured to receive the first and second coded OFDM signals, and an orthogonality operation unit configured to apply an orthogonality operation on one or more of the received first coded OFDM signals and the-received second coded OFDM signals or respective particular ones thereof, so that time overlapping first and second coded OFDM symbols of successive blocks of OFDM symbols are orthogonal to each other.

14. The receiver according to claim 13, wherein the orthogonality operation unit is arranged to apply a phase rotation operation on one or more of the first coded OFDM signals and the second coded OFDM signals or respective particular ones thereof so that overlapping symbols have a phase difference of 90° relative to each other.

15. A method for transmitting and receiving OFDM signals, comprising:

in a first OFDM transmission unit, generating first coded data symbols by arranging the OFDM symbols of the sequence or variants thereof in a space-time or space-frequency block matrix or a portion thereof, and transmitting the first coded data symbols, in a second OFDM transmission unit spatially separated from the first OFDM transmission unit, receiving the first coded data symbols, generating second coded data symbols by arranging the OFDM symbols of the sequence or variants thereof in the space-time or space-frequency block matrix or a portion thereof, and transmitting the second coded data symbols, and applying an orthogonality operation on the first or second coded data symbols or on respective particular ones thereof so that time overlapping first and second coded data symbols of successive blocks of coded data symbols are orthogonal to each other.

16. The method according to claim 15, wherein the orthogonality operation is comprised of a phase rotation of received OFDM symbols.

17. The method according to claim 15, wherein the orthogonality operation is comprised of a signal strength or signal power variation of transmitted OFDM symbols.

18. The method according to claim 15, further comprising receiving the first coded OFDM symbols by the second OFDM transmission unit with one or more reception antenna.

19. The method according to claim 15, further comprising receiving the first and second coded OFDM symbols with more than one reception antenna.

* * * * *